(12) United States Patent
Benischek et al.

(10) Patent No.: US 9,753,241 B2
(45) Date of Patent: Sep. 5, 2017

(54) LASER AUTOCOLLIMATOR USING OPTICAL PARASITIC INTERFERENCE

(71) Applicant: LOCKHEED MARTIN CORPORATION, Bethesda, MD (US)

(72) Inventors: Vincent P. Benischek, Shrub Oak, NY (US); Mark S. Hinrichs, Levittown, NY (US); Francesco Pellegrino, Cold Spring Harbor, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 188 days.

(21) Appl. No.: 14/847,550

(22) Filed: Sep. 8, 2015

(65) Prior Publication Data

US 2017/0068066 A1    Mar. 9, 2017

(51) Int. Cl.
| | |
|---|---|
| *G02B 27/14* | (2006.01) |
| *G02B 7/00* | (2006.01) |
| *G01J 1/42* | (2006.01) |
| *G01J 1/02* | (2006.01) |

(52) U.S. Cl.
CPC ............ *G02B 7/003* (2013.01); *G01J 1/0266* (2013.01); *G01J 1/4257* (2013.01); *G02B 27/14* (2013.01)

(58) Field of Classification Search
CPC ........ G02B 27/14; G02B 7/003; G01J 1/4257
USPC ............................................. 250/216, 559.3
See application file for complete search history.

(56) References Cited

U.S. PATENT DOCUMENTS 5,313,270 A * 5/1994 Fishman ................ G01N 21/55
356/445

* cited by examiner

*Primary Examiner* — Que T Le
(74) *Attorney, Agent, or Firm* — Hamre, Schumann, Mueller & Larson, P.C.

(57) ABSTRACT

A laser autocollimator assembly that provides an objective, unambiguous, and simple means to achieve precise (for example, arc second or sub arc-second) alignment between the laser autocollimator assembly and a reference surface. The laser autocollimator assembly relies on optical parasitic interference between a reflected beam from the reference surface and the laser beam in the laser cavity that, when alignment is achieved, results in a disruption of the action of the laser, resulting in a reduction in the output power level of the laser beam. By monitoring the power level of the laser beam, for example monitoring the power level of the reflected beam, it can be determined that alignment has been achieved when the power level of the laser beam has been reduced to a minimum level. The power level can be automatically monitored, thereby eliminating the need for user interpretation.

13 Claims, 6 Drawing Sheets

LASER AUTOCOLLIMATOR USING OPTICAL PARASITIC INTERFERENCE

This invention was made with Government support under Contract Number N00030-14-C-0002 awarded by The Department of The Navy, Strategic Systems Programs. The Government has certain rights in the invention.

FIELD

This disclosure relates to an autocollimator, more specifically to a laser autocollimator that can determine alignment between the laser autocollimator and a reference surface using optical parasitic interference between the laser beam and a return reflected beam.

BACKGROUND

An autocollimator works by projecting light from a light source onto a target surface which deflects the light, and measuring deflection of the returned light against a scale such as cross hairs. In nearly all cases, user interpretation is required to determine whether alignment, defined as the perpendicularity of the light source to the target surface, has been achieved.

SUMMARY

A laser autocollimator assembly is described that provides an objective, unambiguous, and simple means to achieve precise (for example, arc second or sub arc-second) alignment between the laser autocollimator assembly and a reference surface. The laser autocollimator assembly described herein relies on optical parasitic interference between a return reflected beam from the reference surface and the laser beam in the laser cavity that, when alignment is achieved, results in a disruption of the action of the laser, resulting in a reduction in the output power level (i.e. reduction in the optical gain) of the laser beam. By monitoring the power level of the laser beam, it can be determined that alignment has been achieved when the power level of the laser beam has been minimized. The minimized power level is an indication of alignment to the reference surface. In some embodiments, the power level can be automatically monitored, thereby eliminating the need for user interpretation.

The power level can be monitored in any suitable manner. For example, the power level of a return reflected beam that results from the laser beam impacting on the reference surface can be monitored by a power detector. In another embodiment, the power of the transmitted laser beam from the laser transmitter can be monitored by a power detector. Any power level detection, whether of the transmitted laser beam, the return reflected beam, or other power level detection, that reflects the reduction in power resulting from the optical parasitic interference that occurs upon alignment can be utilized.

The laser autocollimator assembly includes a laser transmitter, a beam splitter and a power detector. A laser beam from the laser transmitter is directed through the beam splitter onto a reference surface. The laser autocollimator assembly and the reference surface are adjusted relative to one another so that a reflected beam resulting from the laser beam impacting on the reference surface interferes with the laser beam transmitted from the laser transmitter. In some embodiments, the position of the laser autocollimator assembly can be adjusted relative to the reference surface to achieve alignment. In other embodiments, the position of the reference surface can be adjusted relative to the laser autocollimator assembly to achieve alignment. In still other embodiments, the positions of both the laser autocollimator assembly and the reference surface can be adjusted to achieve alignment. In one embodiment, the power detector detects the power level of the reflected beam, and when the detected power level of the reflected beam is minimized, the laser autocollimator assembly and the reference surface are determined to be in alignment.

In some embodiments, when it is desired to maintain alignment once it is achieved, the positions of one or both of the laser autocollimator assembly and the reference surface can be automatically or manually adjusted so that the detected power level of the reflected beam is maintained at the minimized power level. In other embodiments, once alignment has been achieved, deflections of the reference surface relative to the laser autocollimator assembly can be automatically monitored based on displacement of the optical axis of the transmitted laser beam from the optical axis of the reflected beam, as well as by variations in the detected power level of the reflected beam from the minimized power level.

In one embodiment, a display device that can be part of or connected to the power detector can display a digital readout of real-time position coordinates of the laser beam and the reflected beam relative to one another, including at initial alignment and during dynamic changes (for example flexure, misalignment, deformation, deflection, and the like) of the reference surface, to arc-second or sub arc-second accuracies through the use of a reflected beam position sensor. The display device can also display a digital readout of the detected power level, either separately from or in addition to the position coordinates.

The described laser autocollimator assembly can be used to achieve precise, for example arc second or sub arc-second, initial alignment between the laser autocollimator assembly and the reference surface. In some embodiments, the laser autocollimator assembly and the reference surface can be separated by a large linear distance such as, but not limited to, greater than about 10 feet or more, or greater than about 40 feet or more.

Example applications of the laser autocollimator assembly and techniques described herein can include, but are not limited to: optical alignment; civil and commercial surveying and alignment; monitoring of sway, flexure and other deformations of bridges, buildings and other structures; designing earthquake resistant structures; docking of aircraft, surface ships, underwater vehicles, and space craft; alignment during in-flight refueling of aircraft; alignment of laser weaponry; surgical applications; gem cutting; and many others. In one specific embodiment, the laser autocollimator assembly and the techniques described herein can be used to align an Inertial Navigation Unit (INU) to an Optical Reference Assembly (ORA). In another specific embodiment, the laser autocollimator assembly and the techniques described herein can be used for measuring/registering an antenna housing relative to itself or to a permanent reference "monument".

DRAWINGS

DETAILED DESCRIPTION

Figure 1:
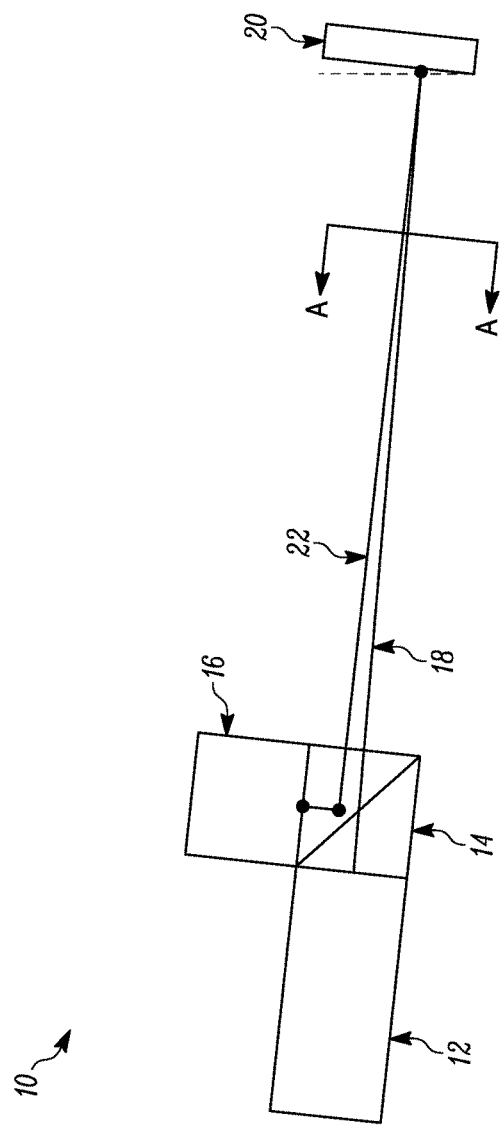
FIG. 1 illustrates an example of a laser autocollimator assembly described herein that is projecting a laser beam onto a reference surface.

With reference initially to FIG. 1, an embodiment of a laser autocollimator assembly 10 is illustrated. The assembly 10 includes a laser transmitter 12, a beam splitter 14, and a power detector 16. The laser transmitter 12 generates and transmits a laser beam 18 through the beam splitter 14 and onto a reference surface 20. The reference surface 20 reflects a return beam or wave 22 back toward the assembly 10. The beam splitter 14 deflects the return reflected beam 22 toward the power detector 16 which detects the power of the reflected beam 22.

Depending upon the relative orientations of the assembly 10 and the reference surface 20, the reflected beam 22 interferes with the optical gain of the laser cavity in the laser transmitter 12. This interference is referred to herein as optical parasitic interference. This interference corrupts the output power of the laser transmitter 12 which is reflected in a drop in the power output of the laser transmitter 12 and therefore a drop in the power of the transmitted laser beam 18 and a drop in the power of the resulting reflected beam 22. By adjusting the relative positions of the assembly 10 and the reference surface 20, the parasitic interference, and the resulting drop in power of the transmitted laser beam 18 and the reflected beam 22, can be varied. Maximum interference, and thus maximum reduction in power, occurs when the transmitted laser beam 18 and the reflected beam 22 are aligned with one another. Therefore, by monitoring the power of the reflected beam 22, one can determine alignment when a minimum power level of the reflected beam 22 is reached.

Figure 2:
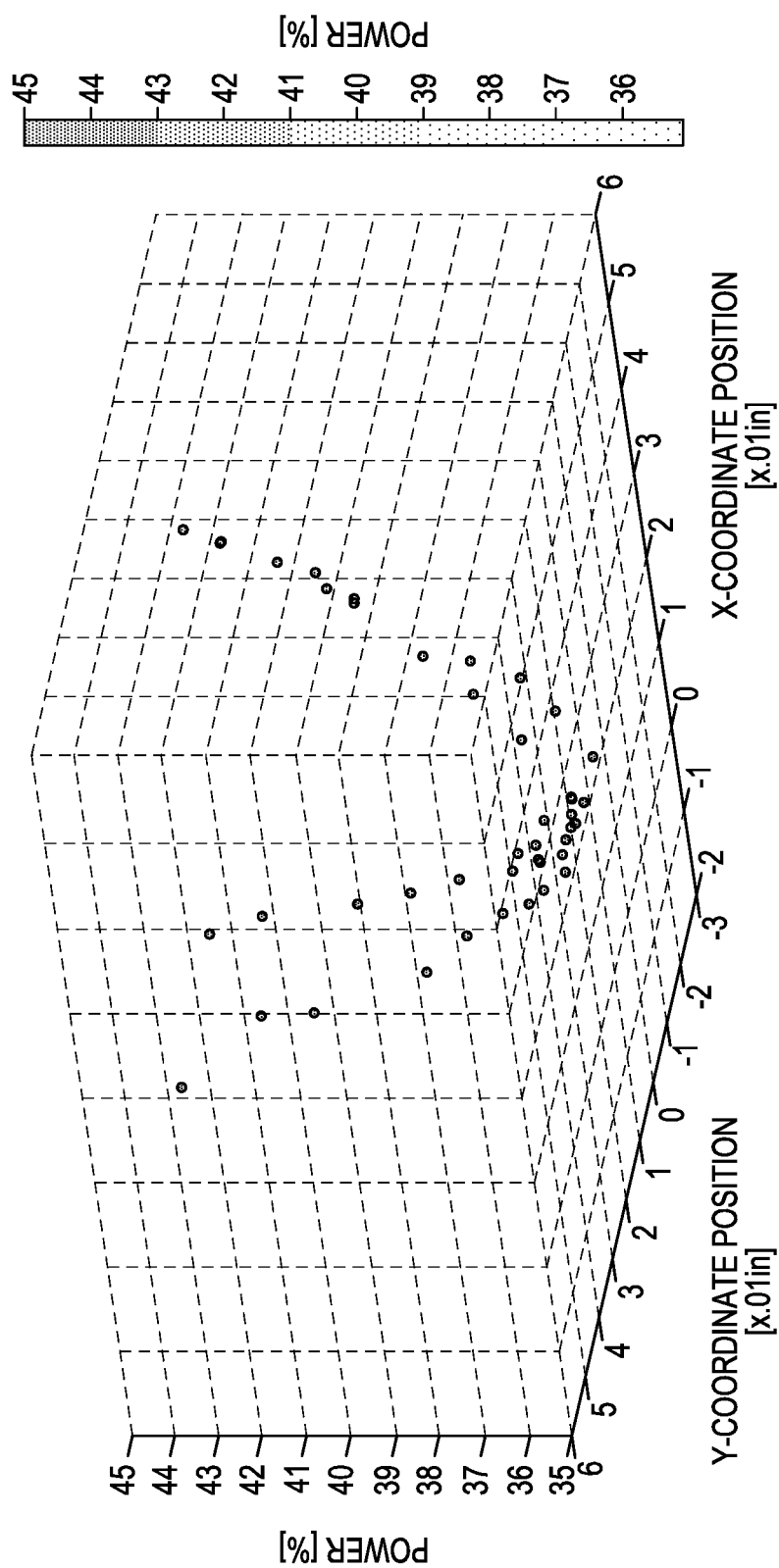
FIG. 2 is a three dimensional chart plotting detected laser power versus displacement of the laser autocollimator assembly in an x-direction and a y-direction, illustrating the drop off in power of the return reflected beam from the reference surface upon achieving alignment.
Figure 4:
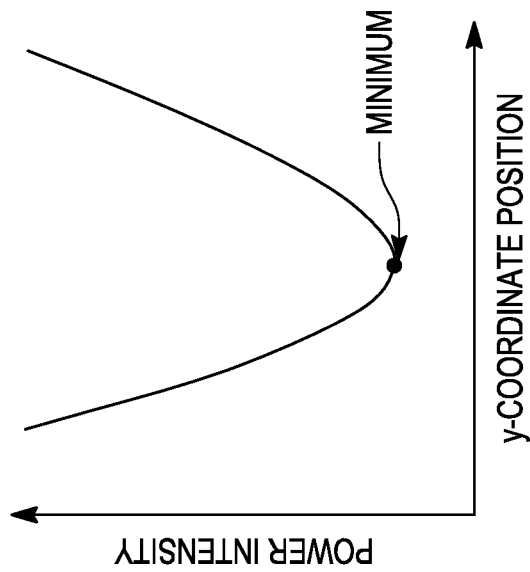
FIG. 4 is a chart of power of the return reflected beam versus a y-coordinate of the two-dimensional coordinate system established by the power detector of the laser autocollimator assembly illustrating the drop off in power of the return reflected beam in the y-coordinate direction upon achieving y-coordinate direction alignment.
Figure 3:
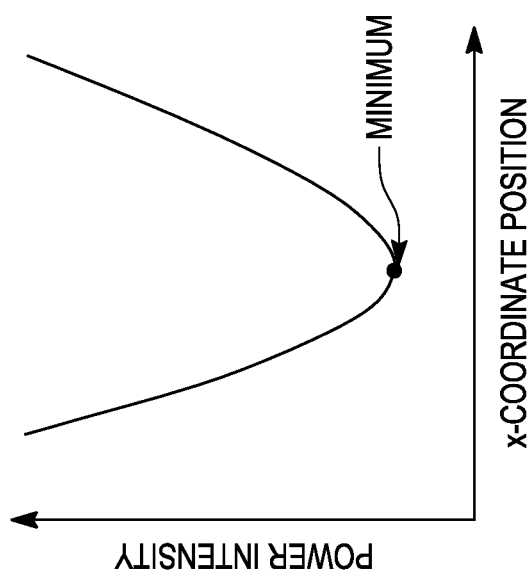
FIG. 3 is a chart of the power of the return reflected beam versus an x-coordinate of a two-dimensional coordinate system established by the power detector of the laser autocollimator assembly illustrating the drop off in power of the return reflected beam in the x-coordinate direction upon achieving x-coordinate direction alignment.

The charts in FIGS. 2-4 show the drop in power that occurs when the transmitted laser beam 18 and the reflected beam 22 become aligned in both an x-coordinate direction and a y-coordinate direction. At a point where the laser power is at its minimum, the assembly 10 can be considered aligned with the reference surface 20, and the x-coordinate and the y-coordinate at alignment can be considered an origin (x=0, y=0) in an x, y coordinate system for example if one wishes to quantify subsequent deflections of the reference surface.

Figure 5:
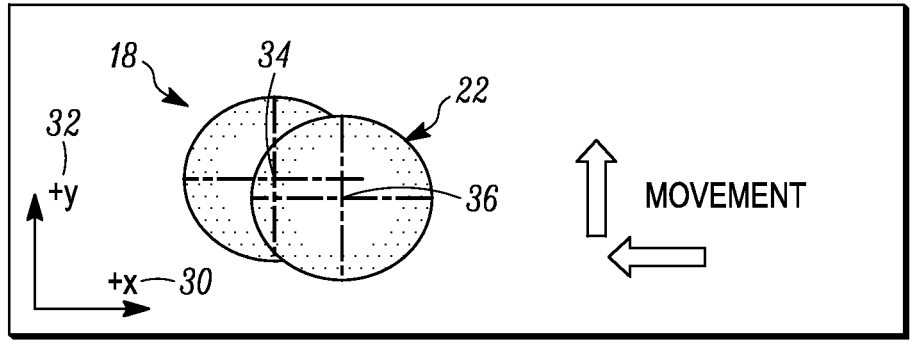
FIG. 5 depicts a representation of the profiles of both the transmitted laser beam and the return reflected beam viewed from the direction A-A in FIG. 1, with the profiles slightly misaligned but approaching alignment.

FIG. 5 depicts a profile of the transmitted laser beam 18 and the reflected beam 22 viewed from the direction A-A in FIG. 1. The transmitted beam 18 includes an optical axis 34 and the reflected beam 22 includes an optical axis 36. The optical axes 34, 36 of the two beams 18, 22 are offset from one another in an x-coordinate direction 30 (or horizontal direction when viewing FIG. 5) and in a y-coordinate direction 32 (or vertical direction when viewing FIG. 5). The relative positions of the assembly 10 and the reference surface 20 can be adjusted to minimize the x, y displacement so that the optical axis 34 of the transmitted beam 18 is substantially aligned with the optical axis 36 of the reflected beam 22 at which point the power measured by the power detector 16 will be at its minimum. It is to be noted that the measured minimum power will not be zero. However, the minimum power will be measurably less than the measured power when the transmitted beam 18 and the reflected beam 22 are not achieving maximum parasitic interference.

Figure 6:
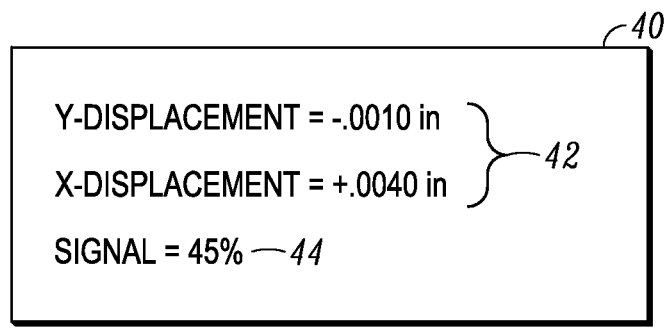
FIG. 6 depicts a display that provides a digital readout of the real-time position coordinates and detected power of the return reflected beam as determined by the power detector of the laser autocollimator assembly.

FIG. 6 depicts a display 40 that can be part of, or suitably connected to, the power detector 16 of the assembly 10. The display 40 can provide a digital readout of the real-time x, y position coordinates 42 of the optical axis 36 of the reflected beam 22 relative to the optical axis 34 of the transmitted beam 18. In this example, it is assumed that the optical axis 34 of the transmitted beam is the origin (x=0, y=0). In the representative example illustrated in FIG. 5, it is seen that the optical axis 36 of the reflected beam 22 is located vertically below the optical axis 34 (i.e. a negative y-direction) a certain distance and located horizontally to the right of the optical axis 34 (i.e. a positive x-direction) a certain distance. The x-direction displacement and the y-direction displacement can be measured in, for example, inches or other units of measure.

The display 40 can also provide a digital readout of the detected laser power 44 either separately from the x, y position coordinates 42 or in addition to the coordinates 42 as illustrated in FIG. 6. When the detected laser power reaches its minimum level, the reflected beam 22 is considered aligned with the transmitted beam 18, and the assembly 10 is considered aligned with the reference surface 20. In this example, the detected laser power 44 is displayed as a percentage of an expected maximum laser power. However, the detected laser power 44 can be visually displayed in other units of measure and in visual formats other than numerical numbers.

In one embodiment, the detected laser power 44 can be the primary variable that determines when the transmitted laser beam 18 and the reflected beam 22 are aligned with one another, which in turn indicates whether the assembly 10 and the reference surface 20 are aligned. When the detected power level 44 is at its minimum level, the assembly 10 and the reference surface 20 are considered to be aligned. The detected power level 44 could be at its minimum level even though the x, y position coordinates 42 are not precisely zero. However, once the minimum power level 44 is reached, the corresponding x, y position coordinates 42 can be considered the origin for measuring any subsequent x, y positional displacements, or the display 40 can be zeroed out at that time so that the x, y position coordinates 42 are displaying zero.

Figure 7:
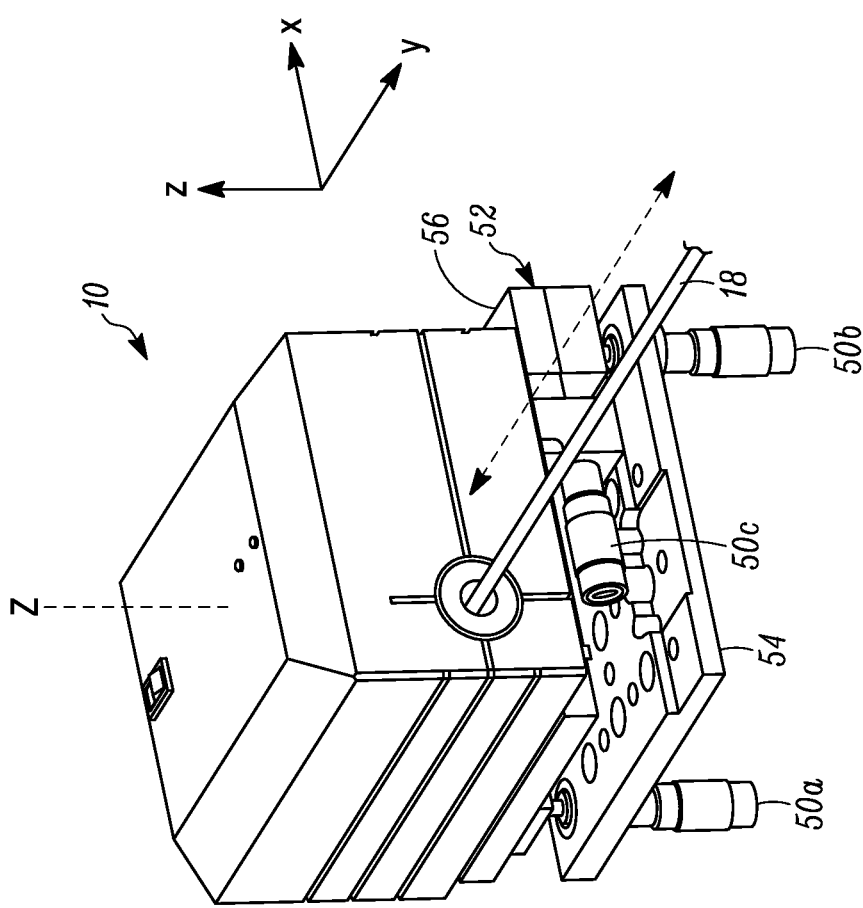
FIG. 7 depicts an embodiment where the position of the laser autocollimator assembly can be adjusted using actuators.

As indicated above, the minimum detected power level can be achieved by adjusting the relative positions of the assembly 10 and the reference surface 20. Such adjustments can occur automatically or manually. For example, FIG. 7 depicts an embodiment where the position of the assembly 10 can be adjusted. In this example, position adjustment of the assembly 10 can be achieved using a plurality of actuators 50a, 50b, 50c that are connected to a support structure 52 on which the assembly 10 is mounted. The support structure 52 can include a lower support 54 and an upper support 56 on which the assembly 10 is mounted. The lower support 54 and the upper support 56 form a three-dimensional universal mount whereby the lower support 54 and the upper support 56 can be tilted together by the actuators 50a, 50b relative to an x-y plane and can be moved linearly up and down together by the actuators 50a, 50b in a z-axis direction. In addition, the upper support 56 can be rotated relative to the lower support 54 by the actuator 50c about the z-axis. The actuators 50a-c can be any type of actuators suitable for achieving precise, fine positional adjustments of the assembly 10. In some embodiments, the actuators 50a-c can be hydraulic, pneumatic, or piezoelectric actuators, or manually actuated.

Figure 8:
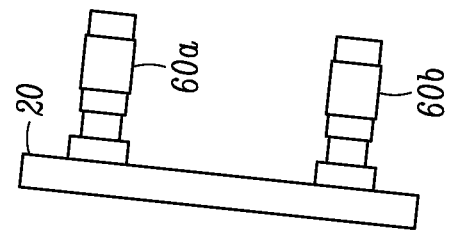
FIG. 8 depicts an embodiment where the position of the reference surface can be adjusted using actuators.

In other embodiments, the position of the reference surface 20 can be adjusted in order to achieve alignment. FIG. 8 depicts an embodiment where the position of the reference surface 20 can be adjusted using one or more actuators 60a, 60b that can be similar in construction to the actuators 50a-c. The actuators 60a, 60b can be directly connected to the reference surface 20, or the reference surface 20 can be mounted on a support structure (not illustrated) that is connected to the actuators 60a, 60b.

In still other embodiments, the position of the assembly 10 can be adjusted (for example as illustrated in FIG. 7) and the position of the reference surface 20 can be adjusted (for example as illustrated in FIG. 8) to achieve alignment.

Figure 9:
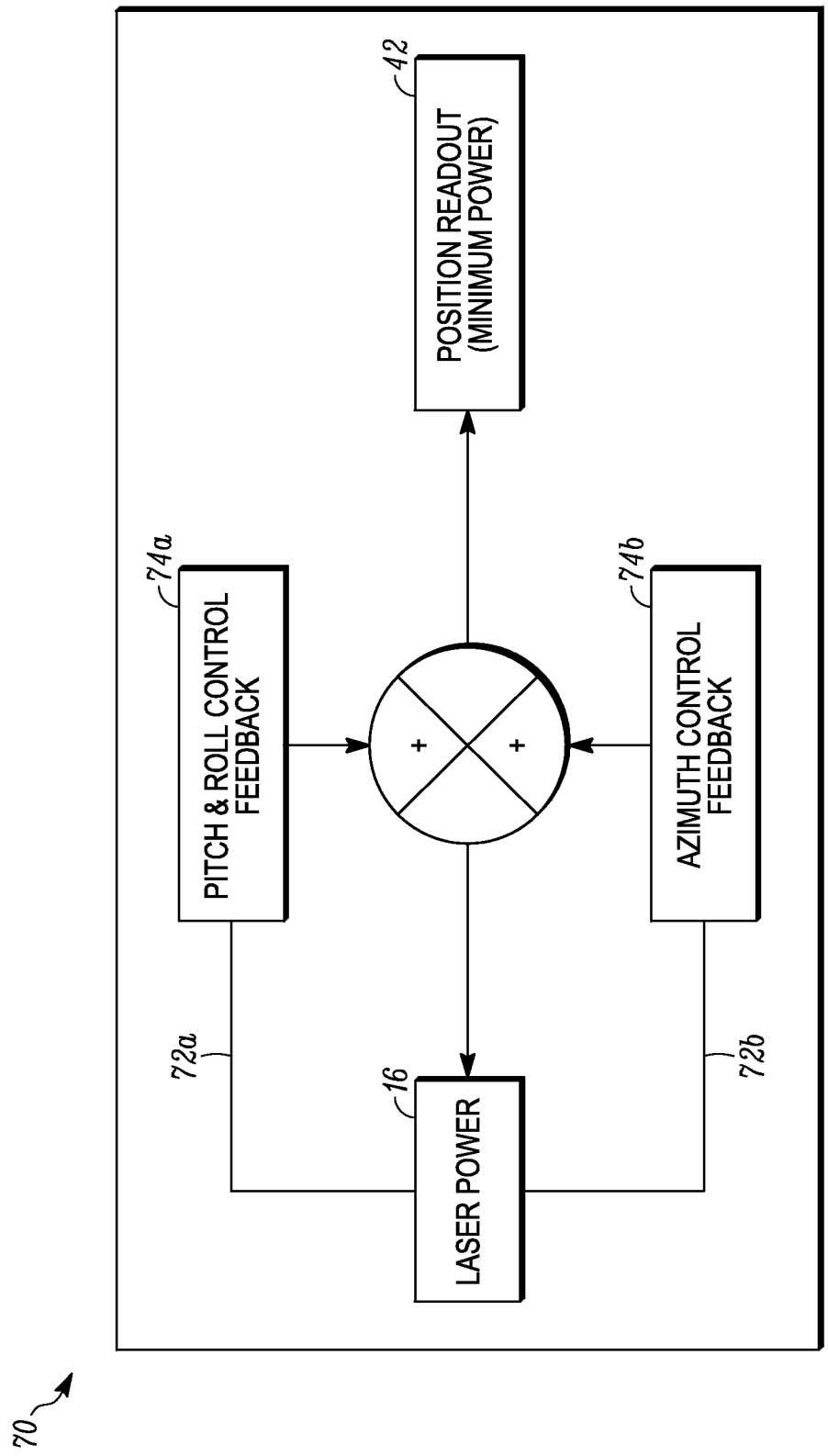
FIG. 9 depicts an embodiment that uses feedback control to maintain alignment of the transmitted laser beam and the return reflected beam.

Once alignment is achieved, a control system that is connected to the actuators 50a-c and/or 60a-b can detect deviations from the initial alignment, and can adjust the position of the assembly 10 relative to the reference surface 20 so that the detected output power level 44 is maintained at the minimum power level. For example, with reference to FIG. 9, a control system 70 is illustrated. The control system 70 uses feedback control to maintain alignment of the transmitted laser beam 18 and the reflected beam 22. For example, the power detector 16 detects the power level, and based on deviations from the minimum power level at alignment, control signals 72a, 72b are sent to a pitch and roll controller 74a and to an azimuth controller 74b. The pitch and roll controller 74a suitably controls the actuators 50a, 50b to achieve the desired positional adjustments in pitch and roll directions (i.e. tilting of the assembly 10), while the azimuth controller 74b suitably controls the actuator 50c to achieve the desired positional adjustments in an azimuthal direction (i.e. rotation of the assembly 10 about the z-axis). In another embodiment, the controllers 74a, 74b could alternatively be controlled via suitable controls signals based on x, y positional deviations from the x, y origin.

In another embodiment, once alignment is achieved, the techniques described herein can be used to determine a magnitude and direction of a deflection of the reference surface 20 relative to the assembly 10. For example, once alignment is achieved and the origin of the x, y coordinate system is established, deflections of the reference surface 20 and the assembly 10 relative to one another will result in deviation of the detected power level from its minimum value, but also a deviation in the x, y position coordinates.

In one example, the x, y positional coordinates deviation can be used, together with the distance between the assembly 10 and the reference surface 20 which is known, to calculate the magnitude, as well as the direction, of the deflection of the reference surface using simple geometry. In another example, a table of detected power levels and corresponding deflection magnitudes can be established and stored in suitable memory. Thereafter, by accessing the table with the actual detected output power level, the corresponding deflection magnitude can then be determined.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method comprising:
    a) providing a laser assembly that includes a laser transmitter, a beam splitter and a power detector;
    b) directing a laser beam from the laser transmitter through the beam splitter onto a reference surface;
    c) using the power detector, detecting a power level of a return reflected beam resulting from the laser beam impacting on the reference surface;
    d) adjusting the laser assembly and the reference surface relative to one another to cause the return reflected beam to interfere with the laser beam transmitted from the laser transmitter;
    e) repeating c) and d) until the power level of the return reflected beam detected by the power detector reaches a minimized power level.

2. The method of claim 1, wherein d) comprises adjusting the laser assembly relative to the reference surface.

3. The method of claim 1, after completing e), automatically adjusting the laser assembly relative to the reference surface so that the detected power level of the return reflected beam is maintained at the minimized power level.

4. The method of claim 1, after completing e), determining a magnitude of a deflection of the reference surface relative to the laser assembly.

5. The method of claim 1, wherein the power detector is connected to a digital readout device, and displaying on the digital readout device the power level detected by the power detector and positional deviation of the return reflected beam from the laser beam in a two-dimensional coordinate system established by the power detector.

6. The method of claim 5, wherein the two-dimensional coordinate system comprises a y-axis displacement and an x-axis displacement relative to an origin.

7. A method of aligning a laser transmitter with a reference surface, comprising:
    directing a laser beam from the laser transmitter through a beam splitter and onto the reference surface;
    using a power detector, detecting a power level of a return reflected beam resulting from the laser beam impacting on the reference surface; and
    adjusting the laser transmitter and the reference surface relative to one another to cause the return reflected beam to interfere with the laser beam transmitted from the laser transmitter and until the detected power level of the return reflected beam reaches a minimized power level.

8. The method of claim 7, comprising adjusting the orientation of the laser transmitter relative to the reference surface.

9. The method of claim 8, comprising adjusting the orientation of the beam splitter and the power detector in unison with adjusting the orientation of the laser transmitter.

10. The method of claim 8, comprising automatically adjusting the orientation of the laser transmitter relative to the reference surface so that the power level of the return reflected laser beam is maintained at the minimized power level.

11. The method of claim 7, further comprising determining a magnitude of a deflection of the reference surface relative to the laser assembly.

12. The method of claim 7, wherein the power detector is connected to a digital readout device, and displaying on the digital readout device the power level detected by the power detector and positional deviation of the return reflected beam from the laser beam in a two-dimensional coordinate system established by the power detector.

13. The method of claim 12, wherein the two-dimensional coordinate system comprises a y-axis displacement and an x-axis displacement relative to an origin.

* * * * *